(12) United States Patent
Ichieda

(10) Patent No.: US 9,794,536 B2
(45) Date of Patent: Oct. 17, 2017

(54) PROJECTOR, AND METHOD OF CONTROLLING PROJECTOR

(71) Applicant: SEIKO EPSON CORPORATION, Tokyo (JP)

(72) Inventor: Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 27 days.

(21) Appl. No.: 14/537,326

(22) Filed: Nov. 10, 2014

(65) Prior Publication Data
US 2015/0138513 A1    May 21, 2015

(30) Foreign Application Priority Data
Nov. 20, 2013 (JP) .................. 2013-239536

(51) Int. Cl.
*H04N 9/31*    (2006.01)
*G03B 21/14*    (2006.01)

(52) U.S. Cl.
CPC ......... *H04N 9/3185* (2013.01); *H04N 9/3182* (2013.01); *H04N 9/3194* (2013.01); *G03B 21/147* (2013.01)

(58) Field of Classification Search
CPC .... G06F 3/005; G06F 3/0482; G06F 3/04842; G06F 3/04845; G06F 3/04847; G06F 3/04886; G06F 3/0605; G06F 3/0426; G06F 3/0425; G06F 3/017; H04N 9/3173; H04N 9/3185; H04N 9/3182; H04N 9/3194; H04N 9/3176; H04N 9/3188; G06K 9/00355; G06K 9/00335; G06K 9/00389; G03B 21/142; G03B 21/145; G03B 21/147;
(Continued)

(56) References Cited

U.S. PATENT DOCUMENTS 8,118,433 B2    2/2012 Ishii
2009/0190046 A1*    7/2009 Kreiner ................ H04N 9/3182
348/789

(Continued)

FOREIGN PATENT DOCUMENTS

JP    2005141151 A *    6/2005
JP    A-2009-64110    3/2009
(Continued)

*Primary Examiner* — Christina Riddle
*Assistant Examiner* — Christopher Lamb, II
(74) *Attorney, Agent, or Firm* — Oliff PLC

(57) ABSTRACT

A projector includes a main body including a projection unit which projects an image, a movement detecting unit which detects movement of the main body, and an imaging unit which captures an image of a screen. Furthermore, the projector includes a correction control unit which performs trapezoidal distortion correction on the basis of an image-capturing result, and a second processing unit which performs a second process, which is different from the trapezoidal distortion correction, on the basis of the image-capturing result. In a case where it is determined that the main body is moving on the basis of a detection result, an imaging control unit allows the correction control unit to perform the trapezoidal distortion correction, and in a case where it is determined that the main body is stopped, the imaging control unit allows a manipulation detecting unit to perform a manipulation detecting process.

9 Claims, 3 Drawing Sheets

(58) Field of Classification Search
CPC ........ G03B 21/26; G03B 21/30; G03B 17/54; G09G 2354/00
USPC .................................................. 353/69, 70
See application file for complete search history.

(56) References Cited

U.S. PATENT DOCUMENTS

| | | | | |
|---|---|---|---|---|
| 2010/0103385 A1* | 4/2010 | Kubota | ................ | G03B 21/147 353/70 |
| 2010/0103386 A1* | 4/2010 | Kubota | ................ | H04N 9/3185 353/70 |
| 2012/0105813 A1* | 5/2012 | Todoroki | ............. | H04N 9/3194 353/69 |
| 2012/0194545 A1* | 8/2012 | Shibata | ................ | G06F 3/0425 345/629 |
| 2012/0313910 A1 | 12/2012 | Haraguchi et al. | | |
| 2013/0050425 A1* | 2/2013 | Im | ...................... | H04N 13/0207 348/46 |
| 2014/0218300 A1* | 8/2014 | Muraki | ................ | G03B 17/54 345/168 |

FOREIGN PATENT DOCUMENTS

| | | |
|---|---|---|
| JP | A-2010-128102 | 6/2010 |
| JP | 2012-189675 A | 10/2012 |
| JP | 2012-256000 A | 12/2012 |

* cited by examiner

PROJECTOR, AND METHOD OF CONTROLLING PROJECTOR

The entire disclosure of Japanese Patent Application No. 2023-239536, filed Nov. 20, 2013 is expressly incorporated by reference herein.

BACKGROUND

1. Technical Field

The present invention relates to a projector that projects an image on a projection surface, and a method of controlling a projector.

2. Related Art

In the related art, in projectors that project an image onto a projection surface, a projector having a function of correcting distortion of a projection image by using a captured image obtained by capturing an image of the projection surface is known (for example, refer to JP-A-2010-128102). The projector described in JP-A-2010-128102 measures a positional relationship between the projection surface and the projector and performs trapezoidal distortion correction of the projection image.

In a case where the projector has the function of capturing an image of the projection surface, the captured image can be used in a process of correcting distortion of the projection image, and in other processes. On the other hand, the function of correcting the distortion of the projection image is a function which is highly convenient to a user and which is important to the projector.

SUMMARY

An advantage of some aspects of the invention is to provide a projector which is capable of effectively using a function of capturing an image of a projection surface by classifying distortion correction using the function of capturing the image of the projection surface and the other functions from each other, and a method of controlling a projector.

An aspect of the invention is directed to a projector including: a main body including a projection unit which projects an image; a detection unit which detects movement of the main body; an imaging unit which captures an image of a projection surface; a correction unit which performs trapezoidal distortion correction on the basis of an image-capturing result of the imaging unit; a second processing unit which performs a second process, which is different iron the trapezoidal distortion correction, on the basis of the image-capturing result of the imaging unit; and a control unit which allows the correction unit to perform the trapezoidal distortion correction in a case where it is determined that the main body is moving on the basis of a detection result of the detection unit, and which allows the second processing unit to perform the second process in a case where it is determined that the main body is stopped on the basis of the detection result of the detection unit.

According to the aspect of the invention, in a case where it is determined that the main body is moving, the trapezoidal distortion correction is per fanned, and in a case where it is determined that the main body is stopped, a process different from the trapezoidal distortion correction is performed. According to this, the trapezoidal distortion correction is performed in a necessary case, and image-capturing results of the imaging unit are selectively used between the trapezoidal distortion correction and a different process, and thus it is possible to effectively use the imaging unit.

Another aspect of the invention is directed to the projector described above, wherein the second processing unit, which performs the second process, is a manipulation detecting unit which detects a manipulation performed with respect to the projection surface on the basis of the image-capturing result of the imaging unit, and in a case where it is determined that the main body is stopped, the control unit allows the manipulation detecting unit to detect the manipulation.

According to the aspect of the invention, in a case where it is determined that the main body is stopped, the process of detecting the manipulation performed with respect to the projection surface is performed on the basis of the image-capturing result. According to this, the trapezoidal distortion correction performed by using the image-capturing result of the imaging unit, and the process of detecting the manipulation performed with respect to the projection surface are performed in a selective manner. As a result, it is possible to effectively use the imaging unit.

Still another aspect of the invention is directed to the projector described above, wherein the manipulation detecting unit detects a manipulation of an indicator with respect to the projection surface on the basis of the image-capturing result of the imaging unit, and in a case where the detected manipulation corresponds to a condition that is set in advance, the manipulation detecting unit performs a process that is correlated with the condition.

According to the aspect of the invention, in a case where a manipulation corresponding to the condition is performed, it is possible to perform a process that is set in advance by using the image-capturing result of the imaging unit.

Yet another aspect of the invention is directed to the projector described above, wherein the manipulation defecting unit detects the manipulation of the indicator with respect to a manipulation region that is set to the projection surface, According to the aspect of the invention, it is possible to detect the manipulation with respect to the manipulation region that is set to the projection surface by using the image-capturing result of the imaging unit.

Still yet another aspect of the invention is directed to the projector described above, wherein the manipulation defecting unit detects the manipulation of the indicator on the basis of a variation in at least one of brightness and a shape of the manipulation region.

According to the aspect of the invention, it is possible to quickly detect the manipulation of the indicator.

Further another aspect of the invention is directed to the projector described above, wherein the manipulation detecting unit extracts an image of the indicator, which performs indication with respect to the projection surface, from a captured image that is captured by the imaging unit to detect the manipulation of the indicator.

According to the aspect of the invention, it is possible to reliably detect the manipulation of the indicator with respect to the projection surface by using the captured image that is captured by the imaging unit.

Still further another aspect of the invention is directed to a method of controlling a projector including: controlling a projector provided with a main body including a projection unit that projects an image; detecting movement of the main body; capturing an image of a projection surface; and performing trapezoidal distortion correction on the basis of an image-capturing result obtained by capturing the image of the projection surface in a case where it is determined that the main body is moving, and performing a second process, which is different from the trapezoidal distortion correction, in a case where it is determined that the main body is stopped.

According to the aspect of the invention, in a case where it is determined that the main body is moving, the trapezoidal distortion correction is performed, and in a case where it is determined that the main body is stopped, a process different from the trapezoidal distortion correction is performed. According to this, the trapezoidal distortion correction is performed in a necessary case, and image-capturing results of the imaging unit are selectively used between the trapezoidal distortion correction and a different process, and thus it is possible to effectively use the imaging unit.

According to the aspects of the invention, image-capturing results of the imaging unit are selectively used between the trapezoidal distortion correction and a different process, and thus it is possible to effectively use the imaging unit of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment to which the invention is applied will foe described with reference to the attached drawings.

Figure 1:
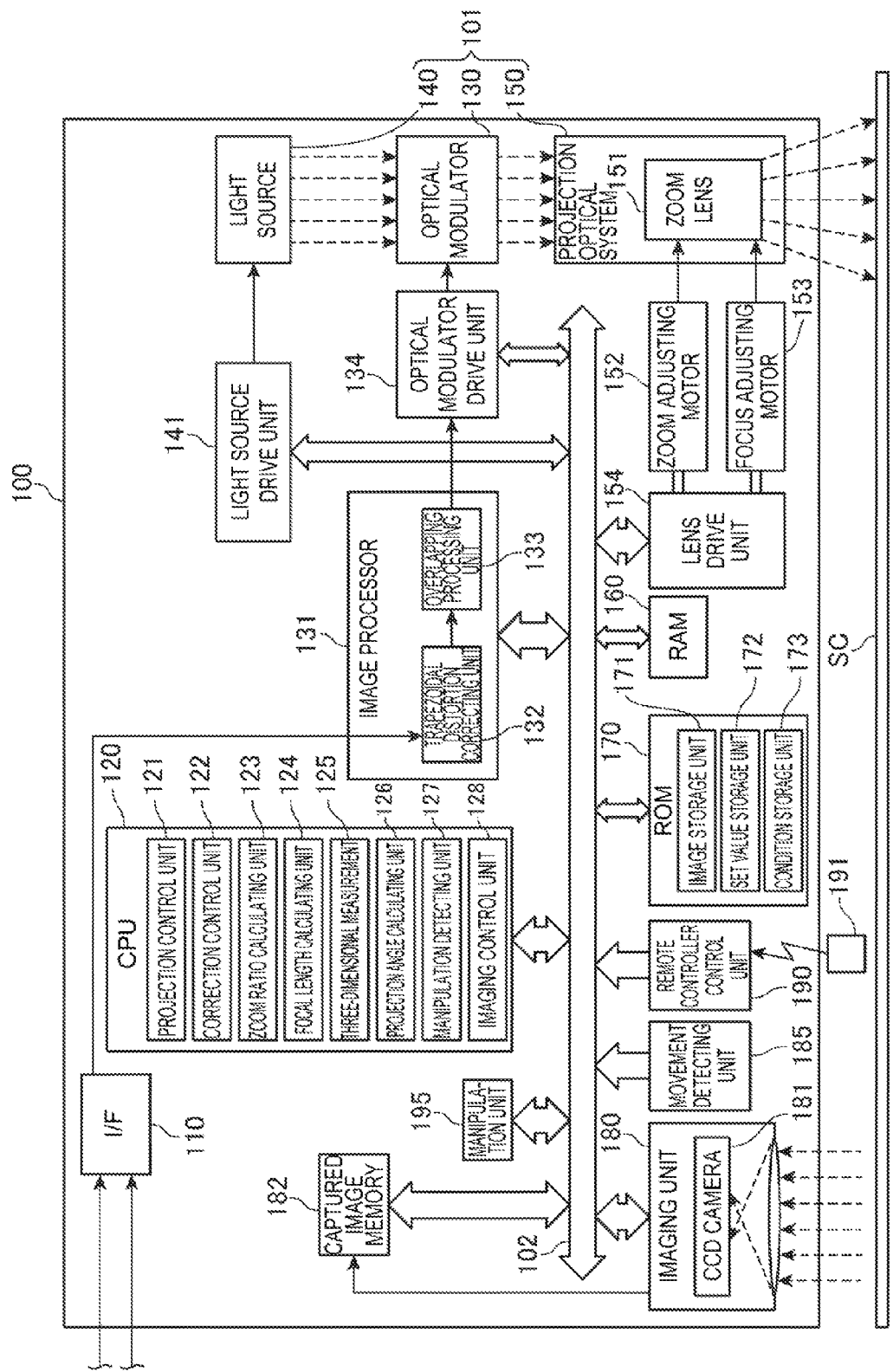
FIG. 1 is a block diagram illustrating a configuration of a projector according to an embodiment.

FIG. 1 is a block diagram illustrating an overall configuration of a projector 100 according to this embodiment. The projector 100 projects an image onto a screen SC (projection surface) on the basis of image data that is stored in a built-in image storage unit 171. In addition, the projector 100 may project an image onto the screen SC on the basis of image data that is input from an external image supply device (not shown) such as a personal computer and various video players. The image data may be moving picture (video) data or still image data.

In this embodiment, a configuration in which the projector 100 performs front surface projection with respect to the screen SC provided with a reflection curtain is exemplified. The screen SC stands substantially upright, and a screen surface has a rectangular shape. In addition, as the projection surface onto which the projector 100 projects an image, a wall surface, a ceiling surface, or a bottom surface of a building may be used, in addition, the screen SC may be provided with a transmitting type curtain, and the projector 100 may project an image from a rear surface of the screen SC.

A main body of the projector 100 includes a projection unit 101 that forms an optical image.

The projection unit 101 includes a light source 140, an optical modulator 130, and a projection optical system 150. As the light source 140, a xenon lamp, an ultrahigh pressure mercury lamp, a light emitting diode (LED), a laser light source, and the like may foe used. In addition, the projection unit 101 may include a reflector that guides light beams emitted from the light source 140 to the optical modulator 130, a dimming unit (not shown) that dims the light beams emitted from the light source 140, and the like.

The optical modulator 130 modulates the light beams emitted from the light source 140 and generates image light. In the optical modulator 130, for example, a method of using three sheets of transmitsive liquid crystal light valves corresponding to respective colors of RGB may be employed. In this case, the light beams emitted from the light source 140 are separated into respective colored light beams of R, G, and B by a dichroic mirror and the like, and are incident to the optical modulator 130. In addition, the three colored light beams are modulated by a three-color liquid crystal panel provided to the optical modulator 130, and the modulated light beams are composed by a cross dichroic prism. The optical modulator 130 is driven by an optical modulator drive unit 134, and optical transmittance at respective pixels arranged in a matrix shape is changed to form an image.

The projection optical system 150 includes a zoom lens 151 that performs enlargement, reduction, and focus adjustment of an image that is projected, a zoom adjusting motor 152 that adjusts a degree of zooming, and a focus adjusting motor 153 that performs focus adjustment. The projection optical system 150 projects the light beams, which are modulated by the optical modulator 130, onto the screen SC. According to this, a projection image is imaged on the screen SC. The zoom lens 151 is constituted by a lens group including a plurality of lenses, and the zoom adjusting motor 152 and the focus adjusting motor 153 drive the lens group of the zoom lens 151. According to this operation, enlargement, reduction, and focus adjustment of the projection image on the screen SC are performed.

In addition, the main body of the projector 100 includes an image processing system that controls all operations of the projector 100 and electrically processes image signals. The image processing system includes a CPU 120 that controls the entirety of the protector 100, an image processor 131, a RAM 160, and a ROM 170. The CPU 120 executes a program stored in the ROM 170, to realize a control function and an image processing function.

The RAM 160 forms a work area that temporarily stores a program executed by the CPU 120 or the image processor 131, or data. In addition, the image processor 131 may include a work area, which is necessary when performing respective processes such as an image display state adjusting process performed by the image processor 131 itself, as a built-in RAM.

The ROM 170 stores a program that is executed by the CPU 120, and data that is processed by the program executed by the CPU 120. In addition, the ROM 170 includes the image storage unit 171, a set value storage unit 172, and a condition storage unit 173.

In addition, the image processing system of the projector 100 includes the optical modulator drive unit 134, a light source drive unit 141, a lens drive unit 154, an imaging unit 180, a captured image memory 162, a movement detecting unit 185, a remote controller control unit 190, a remote controller 191, and a manipulation unit 195. The CPU 120, the image processor 131, and the above-described respective components are connected to each other by a bus 102.

An I/F (interface) 110 is connected to the image processor 131. Image data is input to the I/F 110 from the above-described external image supply device (not shown). The I/F 110 includes a connector that is wire-connected to the image supply device, or a wireless communication device that performs wireless communication with the image supply device. A plurality of image supply devices may be connected to the I/F 110, and image data of a plurality of systems is input to the I/F 110. The I/F 110 switches the input systems of the image data in accordance with control of the CPU 120, and outputs image data to the image processor 131. In this embodiment, image data of two systems including input systems IN1 and IN2 is input to the I/F 110.

The I/F 110 is a digital interface to which digital image data (including digital video data) is input and which outputs the digital image data to the image processor 131. The I/F 110 may have a function of performing a data converting process such as frame conversion, resolution conversion, and 3D/2D conversion of the image data input from the input systems IN1 and IN2. In addition, the I/F 110 may have an A/D (analog/digital) converting function, and thus analog video signals maybe input to the I/F 110 from the image supply device.

The CPU 120 includes a projection control unit 121, a correction control unit 122, a zoom ratio calculating unit 123, a focal length calculating unit 124, a three-dimensional measurement unit 125, a projection angle calculating unit 126, a manipulation detecting unit 127, and an imaging control unit 128, These respective units are realized when the CPU 120 executes a program stored in the ROM 170. The function of the respective units of the CPU 120 will be described later.

The image processor 131 includes a trapezoidal, distortion correcting unit 132 and an overlapping processing unit 133. The image processor 131 processes image data input from the I/F 110 in accordance with control of the CPU 120 to generate image signals, and outputs the image signals to the optical modulator drive unit 134. In addition, in a case where the projector 100 projects image data that is stored in the image storage unit 171, the image processor 131 performs the above-described processing with respect to the image data.

As the image processor 131, a general-purpose processor available on the market as a digital signal processor (DSP) for trapezoidal distortion correction or image processing may be used, or a dedicated ASIC may be used.

The trapezoidal distortion correcting unit 132 corrects an image in accordance with control of the CPU 120 on the basis of parameters for correction which are input from the CPU 120. The trapezoidal distortion correcting unit 132 corrects trapezoidal distortion of a projection image that is projected onto the screen SC by the projector 100, and outputs image data after correction to the overlapping processing unit 133.

The overlapping processing unit 133 performs a process of overlapping a manipulation menu screen and the like of the projector 100 as an OSD image on the image data corrected, by the trapezoidal distortion correcting unit 132. The overlapping processing unit 133 generates image signals for display of the image data after processing, and outputs the image signals to the optical modulator drive unit 134.

In addition, the image processor 131 may perform a process of adjusting an image display state such as brightness, contrast, depth of color, and color tone with respect to image data that is input from the I/F 110 by using the functions of the trapezoidal distortion correcting unit 132 and the overlapping processing unit 133.

The optical modulator drive unit 134 drives the optical modulator 130 on the basis of image signals that are input from the image processor 131. According to this, an image based on the image data that is input to the I/F 110 is formed in an image forming region of the optical modulator 130.

The image that is formed in the optical modulator 130 is formed on the screen SC as a projection image through the projection optical system 150.

The light source drive unit 141 applies a voltage to the light source 140 in accordance with instruction signals that are input from the CPU 120 to turn on and turn off the light source 140.

The lens drive unit 154 drives the zoom adjusting motor 152 and the focus adjusting motor 153 in accordance with control of the CPU 120 to perform zoom adjustment and focus adjustment.

The imaging unit ISO includes a CCD camera 181 using a CCD that is a known image sensor, and a camera lens 183 that is disposed in front of the CCD camera 181. In addition to the CCD, the CCD camera 181 includes peripheral circuits (not shown) such as a control circuit that reads out image signals from the CCD. The imaging unit 180 is provided on a front surface side of the projector 100, that is, at a position capable of capturing an image in a direction, in which the projection optical system 150 projects an image toward the screen SC, by the CCD camera 181. That is, the imaging unit 180 is provided to capture an image in the same direction as the projection direction of the projection optical system 150. An image-capturing direction and an angle of view of the CCD camera 181 are set in such a manner that the entirety of the projection image that is projected onto the screen SC with a recommended projection distance enters at least an image-capturing range.

Data of the captured image that is captured by the CCD camera 181 is output from the imaging unit 180 to the captured image memory 182, and is recorded in a predetermined region of the captured image memory 132. When writing of image data for one screen is completed, the captured image memory 182 sequentially inverts a flag of a predetermined region, and thus the CPU 120 can determine whether or not image-capturing with the imaging unit 180 is completed with reference the flag. The CPU 120 accesses the captured image memory 182 with reference to the flag and acquires necessary captured image data.

The movement detecting unit 185 (detection unit) includes a gyro sensor or an acceleration sensor, detects movement of the main body of the projector 100, and outputs a detected value to the CPU 120. A threshold value is set in advance for the detected value of the movement detecting unit 185. In a case where movement exceeding the threshold value is detected by the movement detecting unit 185, the CPU 120 determines that the projector 100 has moved. In addition, in a case where the movement detected by the movement detecting unit 185 is equal to or less than the threshold value and this state continues beyond a standby time that is set in advance, the CPU 120 determines that the projector 100 is stopped.

In addition, the following configuration is also possible. Specifically, a threshold value may be set to the movement detecting unit 185, and in a case where the detected value of the movement detecting unit 185 exceeds the threshold value and in a case where the detected value of the movement detecting unit 135 is equal to or less than the threshold value and a standby time has been elapsed, the movement detecting unit 185 may output detection signals to the CPU 120. In this case, it is possible to reduce a processing load of the CPU 120.

In addition, the movement detecting unit 185 may detect the movement on the basis of a variation of the captured image of the imaging unit 180. In this case, the movement detecting unit 135 acquires captured, image data from the captured image memory 182, compares the acquired captured image data and captured image data which is captured at a different time, and detects movement in a case where a difference between the two pieces of captured image data is equal to or more than a predetermined value. In this case, it is possible to detect the movement by using the imaging unit 180.

The remote controller control unit 190 receives wireless signals transmitted from the remote controller 191 outside the projector 100. The remote controller 191 includes manipulation elements (not shown) that are manipulated by a user, and transmits a manipulation signal corresponding to manipulation with respect to the manipulation elements as a wireless signal such as an infrared signal. The remote controller control unit 190 includes a reception unit (not shown) that, receives the infrared signal and the like. The remote controller control unit 190 receives signals transmitted from the remote controller 191, analyzes the signals to generate signals indicating the content of the manipulation by the user, and outputs the generated signals to the CPU 120.

For example, the manipulation unit 195 is constituted by manipulation elements (not shown) of a manipulation panel that is disposed at the main body of the projector 100. When detecting a manipulation with respect to the manipulation elements, the manipulation unit 195 outputs manipulation signals corresponding to the manipulation elements to the CPU 120.

The projection control unit 121 that is provided to the CPU 120 controls an image projection operation performed by the projection unit 101 on the basis of image data that is output from the I/F 110, The projection control, unit 121 performs control of turning on and turning off the light source 140 by the light source drive unit 141 in accordance with power on/off of the projector 100, control of allowing the image data output from the I/F 110 to be processed by the image processor 131, and the like.

The correction control unit 122 controls the trapezoidal distortion correcting unit 132, and allows the trapezoidal distortion correcting unit 132 to perform, a distortion correcting process of correcting trapezoidal distortion. The correction control unit 122 functions as a correction unit in cooperation with the trapezoidal distortion correcting unit 132.

The correction control unit 122 acquires captured image data from the captured image memory 182, and analyzes a shape of the captured image data to calculate parameters that are used to correct distortion of a projection image. Here, the correction control unit 122 may project a pattern for correction (not shown), which is stored in the ROM 170, onto the screen SC by the control of the projection control unit 121. In this case, the correction control unit 122 extracts a pattern for correction from the captured image data of the imaging unit 180, and analyzes a shape of the pattern for correction to calculate parameters. The correction control unit 122 outputs the parameters that are calculated to the trapezoidal distortion correcting unit 132 in order for the trapezoidal distortion correcting unit 132 to perform trapezoidal distortion correction in accordance with the parameters.

The zoom ratio calculating unit 123 calculates a zoom ratio for enlargement or reduction of the projection image by the zoom lens 151 in correspondence with a manipulation of the remote controller 191 or a manipulation in the manipulation unit 195. The projection angle calculating unit 126 calculates an inclination of an optical axis of the zoom lens 151 with respect to a plane of the screen SC, that is, a projection angle on the basis of the captured image data stored in the captured image memory 182. In addition, the three-dimensional measurement unit 125 analyzes the captured image data stored in the captured image memory 182 on the basis of the zoom ratio calculated by the zoom ratio calculating unit 123 and the projection angle calculated by the projection angle calculating unit 126 to calculate a distance (projection distance) from a reference position of the zoom lens 151 to the screen SC. The focal length calculating unit 124 calculates an amount of drive of the focus adjusting motor 153 on the basis of the distance calculated by the three-dimensional measurement unit 125 to control the lens drive unit 154 so as to perform focus adjustment.

The correction control unit 122 calculates parameters for correction on the basis of the projection distance, the projection angle, and the like which are calculated by the zoom ratio calculating unit 123, the focal length calculating unit 124, the three-dimensional measurement unit 125, and the projection angle calculating unit 126. The parameters are parameters to deform an image that is drawn by the optical modulator 130 so as to compensate distortion of the projection image on the screen SC. For example, the parameters are parameters including a plurality of pieces of data which define a direction of the deformation, an amount of the deformation, and the like. The correction control unit 122 stores the parameters in the ROM 170 in combination with other calculation results and the like.

The manipulation detecting unit 127 (second processing unit) performs a manipulation detecting process (second process) to detect a position indicating manipulation that is performed on the screen SC by an indicator. The position indicating manipulation is a manipulation with which the indicator indicates a position in an angle of view of the imaging unit 180 during an operation of the projector 100. A specific aspect of the indicator is not limited as long as the indicator can be captured in the captured image data of the imaging unit ISO and distinguish the projection image of the projector 100. For example, the indicator may be a rod-shaped device that is used by a user by hand, or may be instruments having other shapes. The device or instruments may have a light-emitting function or a wireless signal transmitting function, and may not have these kinds of functions. In addition, a part of the user's body (for example, hand or finger) may also be the indicator. In addition, the indicator may be a bright spot that is formed on the screen SC when the screen SC is irradiated with light beams by a light-emitting device (not shown) such as a laser pointer.

The manipulation detecting unit 127 detects that the position indicating manipulation has been performed on the basis of the captured image data stored in the captured image memory 182. The manipulation detecting unit 127 may specify a position indicated by the indicator daring the manipulation detecting process and may output coordinates of the indicated position. In addition, the manipulation detecting unit 127 can detect the manipulation position indicated by the position indicating manipulation during the manipulation detecting process, and can determine whether or not the detected position corresponds to a condition that is set in advance. In addition, the manipulation detecting unit 127 can determine whether or not a trajectory of the detected position corresponds to a condition that is set in advance. Here, the trajectory of the position represents a diagram that is formed by connecting indicated positions in a plurality of times of position indicating manipulations which are detected by the manipulation detecting unit 127 with a time interval. The condition with which the manipulation detecting unit 127 performs determination is stored in the condition storage unit 173 of the ROM 170, in the condition storage unit 173, the condition with which the manipulation detecting unit 127 performs determination, and a process to be performed when defecting a manipulation corresponding to the condition are set in correlation with each other.

In this embodiment, indication of a specific position on the screen SC by the indicator is set as a condition, and switching of an input source is performed as an operation in a case of detecting a manipulation corresponding to the condition. The switching of the input source represents an operation of switching image supply devices (image source) that are connected to the I/F 110. Specifically, the switching of the input source represents an operation of switching the input system IN1 and the input system IN2 by the I/F 110 in accordance with the control of the CPU 120.

FIGS. 2A to 2D are explanatory diagrams illustrating an operation example corresponding to the position indicating manipulation.

Figure 2A:
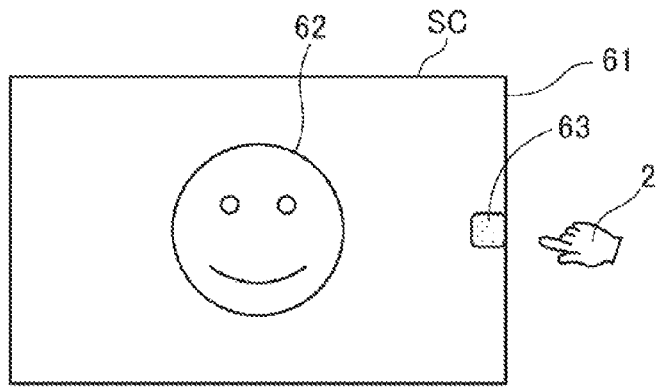
FIGS. 2A to 2D are explanatory diagrams illustrating an operation example corresponding to a position indicating manipulation.

In a state shown in FIG. 2A, a projection image 61 is projected onto the screen SC. The projection image 61 is an image that is projected on the basis of image data input from the input system IN1 of the I/F 110. That is, in the state of FIG. 2A, the I/F 110 selects the input system IN1. The projection image 61 includes an object 62.

When a detection operation of detecting the position indicating manipulation is initiated, the manipulation detecting unit 127 controls the overlapping processing unit 133 so as to project the projection image 61 on which an image 63 for detection is overlapped. The overlapping processing unit 133 overlaps an image of the image 63 for detection, which is stored in the ROM 170 in advance, on an image input from the trapezoidal distortion correcting unit 132, and performs drawing by using the optical modulator drive unit 134. According to this, the image 63 for detection is projected onto the screen SC. The image 63 for detection is disposed at an end of the screen SC at which the image 63 for detection is less likely to block the object 62 and a manipulation is easy. In an example of FIG. 2A, the image 63 for detection has an approximately rectangular shape having a size that is set in advance.

The manipulation detecting unit 127 specifies a position and a size of the image 63 for detection on the captured image. For example, the manipulation detecting unit 127 acquires the position and the size of the image 63 for detection on a panel (an image forming region of the optical modulator 130) by reading out the position and the size from the ROM 170 or by calculating the position and the size. For example, data indicating the position and the size in a case of overlapping the image 63 for detection on the input image, or data indicating the position and the size of the image 63 for detection on the panel may be stored in the ROM 170 in combination with image data of the image 63 for detection.

In addition, the manipulation detecting unit 127 derives the position and the size of the image 63 for detection on the captured image from the position and the size of the image 63 for detection on the panel on the basis of at least one or more parameters among a position of the pattern for correction in the captured image, the projection distance and the projection angle which are calculated by the three-dimensional measurement unit 125 and the projection angle calculating unit 126, and a correction amount (parameter for correction) of distortion in the projection image. In addition, the position of the image 63 for detection on the captured image may be specified by acquiring a difference of the captured image before and after display of the image 63 for detection, or may foe specified by pattern matching.

The manipulation detecting unit 127 sets an overlapping range with the image 63 for detection as a detection region. The manipulation detecting unit 127 specifies an indication position of the indicator on the basis of the captured image data of the imaging unit 180, and in a case where the indication position is in the detection region, the manipulation defecting unit 127 determines that a specific manipulation is made.

As an example, a description will be given to a case in which the hand of the user is used as an indicator 2.

Figure 2B:
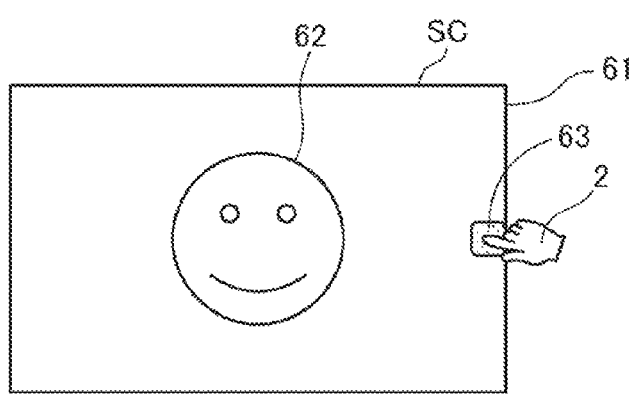

In a state in which the image 63 for detection is projected, when the indicator 2 is overlapped on the image 63 for detection as shown in FIG. 2B, the manipulation detecting unit 127 determines that the indicator 2 is overlapped on the image 63 for detection on the basis of the captured image data of the imaging unit 180. When the indicator 2 is overlapped on the image 63 for detection, light beams projected from the projection unit 101 are blocked by the indicator 2 in front of the screen SC, According to this, in the captured image data of the imaging unit 180, the brightness, color, appearance, and the like of the image 63 for detection vary at a portion at which the indicator 2 is overlapped on the image 63 for detection. The manipulation detecting unit 127 extracts an image of the image 63 for detection, that is, an image of the detection region from the captured image data and analyzes the image to detect a variation in brightness or color, and determines whether or not a manipulation of the indicator 2 has been performed.

The manipulation detecting unit 127 may specify the position of the image 63 for detection on the basis of the position of the pattern for correction which is projected by the correction control unit 122 and the correction amount (parameter) of distortion. In this case, if is possible to detect the manipulation by specifying the position of the image 63 for detection in a more accurate manner. In addition, after acquiring the captured image data of the imaging unit 180 from the captured image memory 182, the manipulation detecting unit 127 may only extract the image 63 for detection which is the detection region, and an image of the periphery of the image 63 for detection, and may analyze the extracted image. In this case, it is possible to reduce an amount of data that is processed in the process of extracting the image of the indicator 2 and the process of comparing the image of the image 63 for detection by the manipulation detecting unit 127, and the like, and thus it is possible to reduce a processing load.

For example, a condition for the manipulation defecting unit 127 to determine whether or not the manipulation is performed with respect to the image 63 for detection is as follows.

In the case where the indicator 2 is present on the image 63 for detection (detection region) for a time period that is set in advance or more, the manipulation detecting unit 127 determines that the manipulation has been performed. Specifically, in a case where any one of the following Expression (1) and Expression (2) is continuously satisfied for a time period set in advance or more with respect to at least partial pixels in the detection region in the captured image data, the manipulation detecting unit 127 determines that the manipulation has been performed.

$$\text{Luminance value of pixel} > \text{First threshold value} \quad (1)$$

$$\text{Luminance value of pixel} < \text{Second threshold value} \quad (2)$$

In addition, the manipulation detecting unit 127 may extract an image of the image 63 for detection from, the captured image data, and may compare the extracted image of the image 63 for detection with an image of the image 63 for detection in captured image data during non-manipulation to detect a variation in a shape of the image of the image 63 for detection. In this case, in a case where the variation in the shape of the image 63 for detection is established for a predetermined. time, the manipulation detecting unit 127 determines that the manipulation has been performed.

In addition, the manipulation detecting unit 127 may extract the image of the indicator 2 from the captured image data, and may compare the position of the image of the indicator 2 and the position of the image 63 for detection to determine whether or not the manipulation has been performed with respect to the image 63 for detection.

The condition, and the first and second threshold values necessary for determination of the condition or data relating to the position, size, shape, and the like of the image 63 for defection are set in advance and are stored in the condition storage unit 173.

In addition, in a case where the manipulation detecting unit 127 performs the above-described determination, a situation in which at least a part of the image 63 for detection appears in the captured image data may be set as the condition. In this case, for example, it is possible to distinguish between a situation in which a user or a person other than the user stands in the vicinity of the imaging unit 180 or in the vicinity of the image 63 for detection and thus the image 63 for detection is hidden, and the manipulation by the indicator 2. In addition, in a case where the image 63 for detection is intentionally manipulated by the indicator 2, the manipulation is detected, and thus it is possible to prevent an unintended, mal-manipulation from being detected.

As shown in FIG. 2B, in a case where the manipulation of the image 63 for detection by the indicator 2 is detected, the manipulation defecting unit 127 performs an operation that is set in advance in correlation with the manipulation. In this embodiment, as described above, the source switching is performed, and the manipulation defecting unit 127 controls the I/F 110 to perform switching from the input system IN1 to the input system IN2.

Figure 2C:
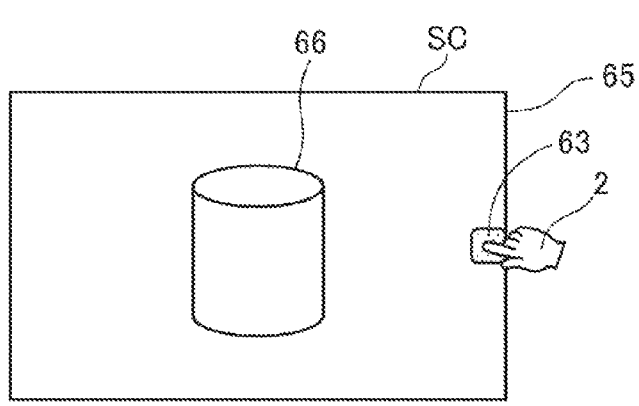

According to this, as shown in FIG. 2C, an image that is projected onto the screen SC is switched from the projection image 61 of the input system IN1 to a projection image 65 of the input system IN2. The projection image 65 is an image including an object 66.

Figure 2D:
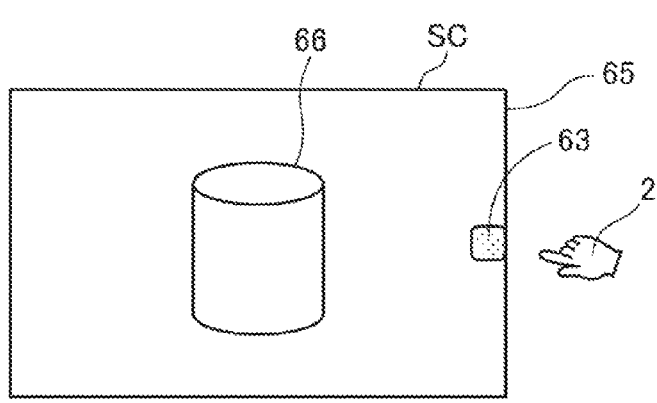

When the manipulation detecting unit 127 continuously performs the manipulation detecting process, even after the switching from the projection image 61 to the projection image 65, as shown in FIG. 2C, the image 63 for detection is projected, Here, as shown in FIG. 2D, when a manipulation by the indicator 2 is performed with respect to the image 63 for detection, the manipulation detecting unit 127 detects the manipulation and switches the source of the I/F 110.

In FIGS. 2A to 2D, an example in which only one image 63 for detection is projected, onto the screen SC is described. However, the number of detection regions is arbitrary, and for example, a plurality of detection regions may be set, and images for detection, which represent respective detection regions, may be projected. In this case, the same operation may be correlated with the respective detection regions, or different operations may be correlated with the respective detection regions. That is, in a case where a manipulation with respect to any one of the plurality of detection regions is detected, one operation that is set may be performed, or an operation correlated with a detection region in which the manipulation is detected may be performed. In addition, operations that are correlated with combinations of a plurality of manipulation regions may be set, and an operation corresponding to a combination of the manipulation regions which is manipulated may be performed. The number of projection regions that are provided on the screen SC, and operations that are set in correlation with the projection regions are set in advance and are stored in the condition storage unit 173.

In addition, in a case where the manipulation detecting unit 127 can specify an indication position of the indicator, an operation (function) of the projector 100 may be allocated with respect to a trajectory of the indication position. In addition, in a case where a plurality of indicators having different shapes are used and the manipulation detecting unit 127 can distinguish shapes of the indicators on the basis of the captured image data, an operation may be allocated in correspondence with the shape of the indicator whose manipulation is detected. In this case, when a manipulation is performed by the indicator, an operation corresponding to the shape of the indicator that is used for the manipulation is performed. In addition, in a case where the indicator is the bright spot on the screen SC which is formed by the pointer or in a case where the indicator has a light-emitting function, an operation may be allocated in correlation with the number of times of blinking of the bright spot or the indicator, a speed, a lighting time, a blinking pattern, and the like.

An operation that is performed in correspondence with the manipulation of the detection region is not limited to the source switching, and for example, a projection control process such as enlargement, reduction, rotation, and movement, of the projection image on the screen SC may be allocated. In addition, a mute function of stopping projection of the image during projection and also stopping an audio output may be allocated. In addition, the above-described operation may be an operation of switching a single display in which an image based on image data of any of the input system IN1 and the input system IN2 is projected, and a multi-display in which a plurality of images based on the image data of the plurality of systems are arranged and are projected, onto the screen SC. In addition, an operation of turning off the power of the projector 100, an operation of drawing a figure by following the indication position of the indicator, an operation of selecting and displaying image data stored in an external storage medium (not shown), and the like may be allocated.

The imaging control unit 128 (control unit) sets an image-capturing resolution in a case where the imaging unit 180 performs image-capturing, and controls the imaging unit 180 to perform the image-capturing. Here, the number of light-receiving elements that are provided to the CCD camera 181 is determined in advance, According to this, the imaging control unit 128 converts the captured image data that is output from the CCD camera 181 to image data having a specific resolution, and stores the converted image data in the captured image memory 182. In this case, the resolution of the captured image data that is stored in the captured image memory 182 by the imaging control unit 128 corresponds to the image-capturing resolution of the imaging unit 180. In addition, captured image data having a resolution, which is designated by the imaging control unit 128 on the basis of a signal output from an imaging element of the CCD camera 181, may be generated by a function of a peripheral circuit (not shown) provided to the CCD camera 181. According to this method, the imaging control unit 128 can adjust the resolution of the captured image data obtained by performing the image-capturing by the CCD camera 181 to an arbitrary resolution. As an example, the imaging control unit 128 of this embodiment can set two-stage image-capturing resolution, including QVGA (320 pixels×240 pixels) and VGA (640 pixels×480 pixels). A resolution which the imaging control unit 123 can set is stored, for example, in the set value storage unit 172 of the ROM 170.

In a case where the correction control unit 122 performs the distortion correcting process, the imaging control unit 128 sets the image-capturing resolution of the imaging unit 180 to a high-quality (high-resolution) VGA. In the distortion correcting process, in a case where a pattern for distortion correction or an external appearance of the projection image on the screen SC can be detected with high accuracy, high-accuracy distortion correction can be performed, and thus this case is preferable.

In addition, in a case where the manipulation defecting unit 127 performs the manipulation detecting process, the imaging control unit 128 sets the image-capturing resolution of the imaging unit 180 to QVGA. In the manipulation detecting process which is performed by the manipulation detecting unit 127, even in a low-resolution image/the manipulation of the indicator can be detected. In addition, when the low-resolution image data is used, an amount of data that is processed becomes small, and thus a processing load is small and the process can be performed with high speed. Accordingly, there is an advantage that the manipulation of the indicator can be quickly detected.

The imaging control unit 128 utilizes one imaging unit 180, and thus the imaging control unit 128 performs control of switching an operation state in which the correction control unit 122 performs the distortion correcting process and an operation state in which the manipulation detecting unit 127 performs the manipulation detecting process, and the imaging control unit 128 sets image-capturing resolutions corresponding to the operation states in the imaging unit 180.

When the distortion correcting process by the correction control unit 122 is performed in accordance with a relative position between the projector 100 and the screen SC, if the relative position does not vary after the performance, the distortion correcting process may not be performed. Accordingly to this, the imaging control unit 128 performs control of detecting movement of the projector 100 by the movement detecting unit 185 and switching the operation state. A description will be given to this operation with reference to a flowchart.

Figure 3:
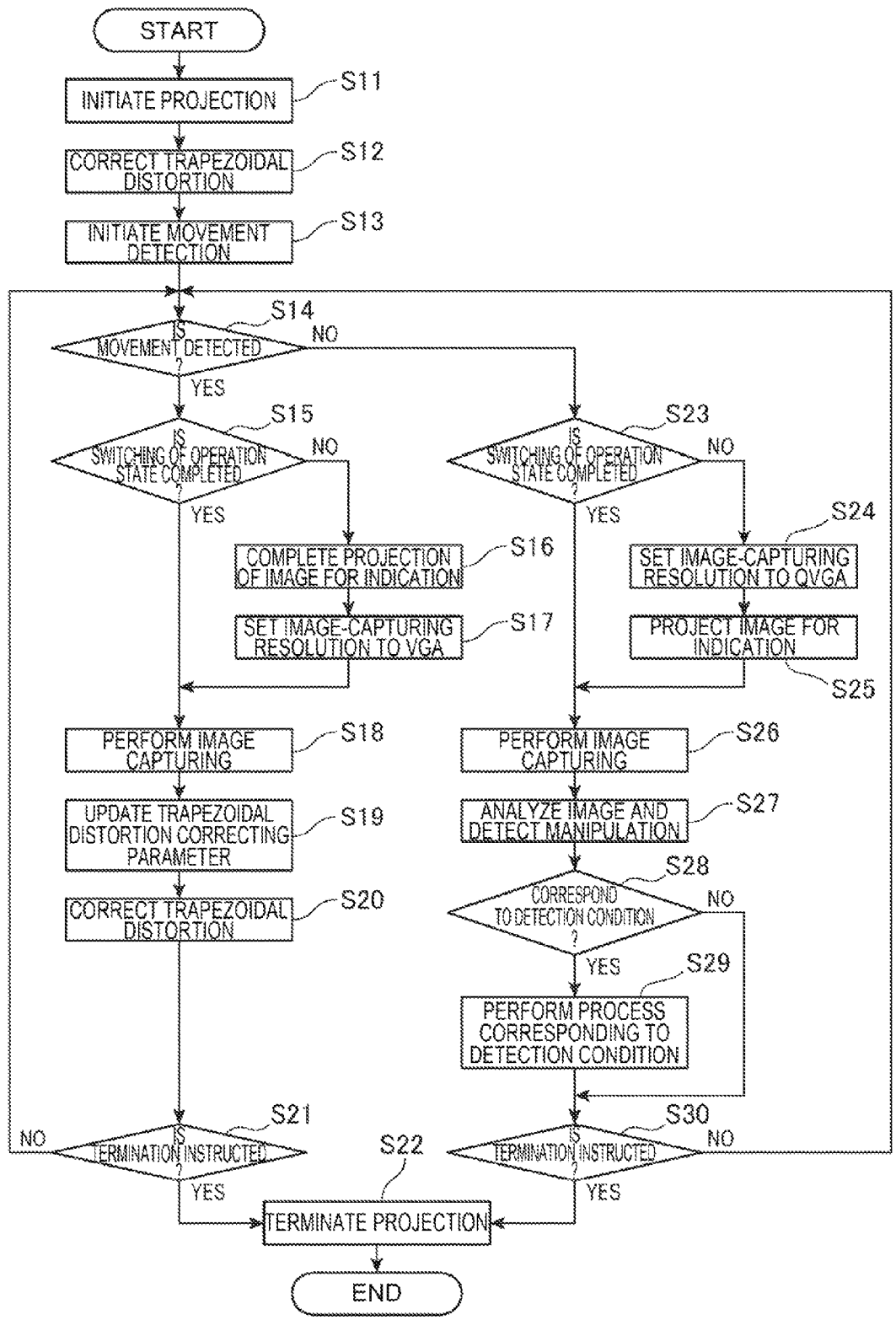
FIG. 3 is a flowchart illustrating an operation of the projector.

FIG. 3 is a flowchart illustrating an operation of the projector 100.

The CPU 120 initiates projection of an image by control of the projection control unit 121 in accordance with a manipulation of the remote controller 191 or the manipulation unit 195 (step S11).

After initiation of the projection, the correction control unit 122 reads out parameters for correction, which have been used when the projector 100 was used at an immediately previous time, from the ROM 170, and performs trapezoidal distortion correction by using the parameters (step 212). In addition, the trapezoidal distortion correction may be performed by using predetermined parameters (initial set values) instead of the immediately previous parameters.

Then, the movement detecting unit 185 initiates movement detection (step S13).

The imaging control unit 128 determines whether or not the projector 100 has moved on the basis of an output from the movement detecting unit 185 (step S14). In a case where the projector 100 is moving, or in a case where a predetermined time has not elapsed after the movement of the projector 100 is stopped, the imaging control unit 128 determines that the projector 100 is moving. In a case where it is determined that the projector 100 is moving (Yes in step S14), the imaging control unit 128 determines whether or not switching of the operation state of the projector 100 is completed (step 815). As described above, in a case where the movement of the projector 100 is detected, an operation state, in which the correction control unit 122 performs the distortion correcting process, is set. In step S15, the imaging control unit 128 determines whether or not the operation state is already set to the operation state in which the distortion correcting process is performed, or whether or not the operation state is an operation state in which the manipulation detecting unit 127 performs the manipulation detecting process.

In a case where the operation state of the projector 100 is not set to the operation state in which the distortion correcting process is performed (No in step S15), the imaging control unit 128 switches an operation state to the operation state in which the distortion correcting process is performed. That is, projection of the image for detection is stopped (step S16), the image-capturing resolution of the imaging unit 180 is set to VGA (step S17), and the imaging control unit 128 transitions to step S18.

In addition, in a case where an operation state of the projector 100 is set to the operation state in which the distortion correcting process is performed (Yes in step S15), the imaging control unit 128 transitions to step S18.

In step S18, the imaging control unit 128 allows the imaging unit 180 to perform image-capturing. Continuously, the correction control unit 122 newly calculates parameters for distortion correction on the basis of the captured image data of the imaging unit 180, and updates parameters that are used by the trapezoidal distortion correcting unit 132 (step S19). The trapezoidal distortion correcting unit 132 performs the trapezoidal distortion correcting process by using the updated parameters (step S20).

The imaging control unit 128 determines whether or not operation completion of the projector 100 is instructed by the manipulation unit 195 or the remote controller 191 (step S21). In a case where a termination instruction is given (Yes in step S21), the CPU 120 stops projection, and terminates this process (step 822). In addition, in a case where the termination instruction is not given (No in step S21), the process returns to step S14 to detect movement.

On the other hand, in a case where it is determined that the projector 100 does not move (No in step S14), the imaging control unit 128 determines whether or not the switching of the operation state of the projector 100 is completed (step S23). In a case where the stopping of the projector 100 is detected, an operation state in which the manipulation detecting unit 127 performs the manipulation detecting process is set. In step S23, the imaging control unit 128 determines whether or not an operation state is already set to the operation state in which the manipulation detecting process is performed or whether or not an operation state is the operation state in which the distortion correcting process is performed.

In a case where the operation state of the projector 100 is not set to the operation state in which the manipulation defecting process is performed (No in step S23), the imaging control unit 128 switches the operation state to an operation state in which the manipulation detecting process is performed. That is, the imaging control unit 128 sets the image-capturing resolution of the imaging unit 180 to QVGA (step S24), and as shown in FIGS. 2A to 2D, the manipulation detecting unit 127 performs control of projecting the image for detection onto the screen SC (step S25), and transitions to step 326.

In addition, in a case where the operation state of the projector 100 is set to the operation state in which the manipulation detecting process is performed (Yes in step S23), the imaging control unit 128 transitions to step S26.

In step S26, the manipulation detecting unit 127 allows the imaging unit 180 to perform image-capturing, and analyses the captured image data to detect a manipulation (step S27).

Here, the manipulation detecting unit 127 determines whether or not a manipulation corresponding to a condition that is set in advance has been performed (step 828). In a case where it is determined that the manipulation corresponding to the condition has been performed (Yes in step S28), the manipulation detecting unit 127 performs an operation that is set in correlation with the condition (step S29). For example, the manipulation detecting unit 127 performs the above-described source switching and transitions to step S30.

In addition, in a case where it is determined by the manipulation detecting unit 127 that the manipulation corresponding to the condition that is set in advance is not performed (No in step 828), the manipulation detecting unit 127 transitions to step S30 as is.

In step S30, the imaging control unit 128 determines whether or not operation termination of the projector 100 is instructed by the manipulation unit 195 or the remote controller 191. In a case where the termination instruction is given (Yes in step S30), the CPU 120 transitions to step S22, and stops the projection and terminates this process. In addition, in a case where the termination instruction is not given (No in step S30), it returns to step 314.

In addition, the operation of the imaging control unit 128 is not limited to the flow control shown in FIG. 3. The imaging control unit 128 may initiate a determination on movement of the projector 100 in step S12, and may perform a determination corresponding to steps S16 and S24 by an interruption control at a point in time at which it is determined that movement of the projector 100 is stopped. In this case, in a case where the projector 100 moves or after the movement is stopped, the imaging control unit 128 can quickly switch the operation state. In addition, this is also true of a case where the projection termination is instructed by the remote controller 191 or the manipulation unit 195. In addition, it is not limited to the flow control shown in FIG. 3, and when the manipulation is detected, the same process as step S27 may be performed by the interruption control.

As described above, the projector 100 includes the main body including the projection unit 101 which projects an image, the movement detecting unit 185 which detects movement of the main body, and the imaging unit 180 which captures an image of the screen SC. In addition, the projector 100 includes the correction control unit 122 which performs trapezoidal distortion correction on the basis of an image-capturing result of the imaging unit 180, and the second processing unit which performs a second process, which is different from the trapezoidal distortion correction, on the basis of the image-capturing result of the imaging unit 180. In a case where it is determined that the main body is moving on the basis of a detection result of the movement detecting unit 185, the imaging control unit 128 allows the correction control unit 122 to perform the trapezoidal distortion correction. In a case where the movement detecting unit 185 determines that the main body is stopped on the basis of the detection result of the movement detecting unit 185, the imaging control unit 128 allows the manipulation detecting unit 127 to perform the manipulation detecting process. According to this, the trapezoidal distortion correction is performed in a necessary case, and a plurality of pieces of captured image data of the imaging unit 180 are selectively used between the trapezoidal distortion correction and the manipulation detecting process, and thus it is possible to effectively use the imaging unit 180.

In addition, the manipulation detecting unit 127 detects a manipulation of the indicator with respect to the screen SC on the basis of the image-capturing result of the imaging unit 180, and in a case where a detected manipulation corresponds to a condition that is set in advance, the manipulation detecting unit 127 performs a process that is correlated with the condition. According to this, in a case where a manipulation corresponding to the condition is performed, it is possible to perform a process that is set in advance by using the image-capturing result of the imaging unit 180. In addition, the manipulation detecting unit 127 can detect a manipulation of the indicator with respect to a manipulation region that is set to the screen SC.

In addition, the above-described embodiment is an example of a specific aspect to which the invention is applied, and the invention is not limited to the embodiment, and the invention may be applied as a different aspect. For example, in the above-described embodiment, a case where an image based on input image data is projected by switching a plurality of input systems IN1 and IN2 which are input to the I/F 110 has been described as an example. That is, an example in which the I/F 110 switches the input system IN1 and the input system IN2 in correspondence with the manipulation detected by the manipulation detecting unit 127 has been described. However, the invention is not limited thereto, and a configuration, in which image data input to the I/F 110 and image data stored in the ROM 170 are switched and projected, is possible. In addition, image data stored in an external storage device that is connected to the projector 100 may be used.

In addition, the process that is set in advance is not limited to the source switching process of switching the input systems IN1 and IN2 of the I/F 110. For example, as the process that is set in advance, a process of performing the above-described mute function and then temporarily stopping an output of an image of the projector 100 or an image and a voice of the projector 100, or a process of restarting the output may be performed. In addition, an electronic zooming process of enlarging or reducing an image that is drawn by the optical modulator 130, a process of controlling the volume of the voice output from, the projector 100, and the like may be performed.

In addition, in the above-described embodiment, as an example, a description has been given to a configuration in which the manipulation detecting unit 127 determines that a manipulation by the indicator 2 has occurred in a case where brightness of the image 63 for detection in the captured image data, varies, and the manipulation detecting unit 127 performs the source switching. That is, the configuration is an example in which the source switching is performed in a case where the indicator 2 is overlapped on the image 63 for detection. The invention is not limited to the example, and the manipulation detecting unit 127 may determine that a manipulation by the indicator 2 has occurred in a case where the brightness of the image 63 for detection in the captured image data varies and the brightness returns to an original state. That is, a configuration, in which a process set in advance is performed when the indicator 2 overlapped on the image 63 for detection on the screen SC is spaced away from the image 63 for detection, is possible.

In addition, in the above-described embodiment, set values relating to a time at which the operation of each of the units of the projector 100 is defined, and a threshold value are stored in advance in the ROM 170, but the invention is not limited thereto. A configuration, in which the above-described set values are stored in a storage medium or a storage device outside the projector 100, and the set values are acquired by the projector 100 as necessary, is possible. In addition, a configuration, in which the set values are input whenever a manipulation by the remote controller 191 or the manipulation unit 195 is made, is possible.

In addition, in the above-described embodiment, a description has been given to a configuration in which the projection unit 101 and the imaging unit 180 are fixed to the main body of the projector 100, but the projection unit 101 and the imaging unit 180 may be configured as a separate unit from the main body of the projector 100. In addition, in the above-described embodiment, a description has been given to a case where the correction control unit 122 corrects the trapezoidal distortion of the projection image. However, for example, a process of correcting distortion called barrel distortion or spool distortion may be performed.

In addition, in the above-described embodiment, a description has been given to a configuration in which the imaging unit 180 includes the CCD camera 181 including the CCD image sensor, but a CMOS sensor may be used as the image sensor. In addition, in the above-described embodiment, a description has been given to a configuration in which three sheets of transmissive liquid crystal panels corresponding to respective colors of RGB are used as the optical modulator, but reflective liquid crystal panels may be used. In addition, for example, the optical modulator may be configured as a type in which one sheet of liquid crystal panel and a color wheel are combined, a type in which three sheets of digital mirror devices (DMDs) that modulate colored light beams of respective colors of RGB are used, a type in which one sheet of digital mirror device and a color wheel are combined, and the like.

In addition, the respective functional units that are shown in FIG. 1 represent functional configurations of the projector 100, and a specific mounting aspect is not particularly limited. That is, it is not necessary for hardware individually corresponding to each of the functional units to be mounted, and a configuration, in which functions of a plurality of functional units are realized by executing a program by one processor, is also possible. In addition, in the above-described embodiment, parts of functions which are realized by software may be realized by hardware, and parts of functions which are realized by hardware may foe realized by software.

What is claimed is:

1. A projector, comprising:
a main body;
a movement detector that detects movement of the main body;
a camera;
an image projector in the main body; and
a controller configured to:
determine, based on a detection result of the movement detector, whether the main body has moved within a predetermined amount of time;
when the main body has moved within the predetermined amount of time:
capture. via the camera, an image of the projection surface at a first image-capturing resolution; and
perform trapezoidal distortion correction based on the image of the projection surface at the first image-capturing resolution; and
when the main body has not moved within the predetermined amount of time:
capture, via the camera, an image of the projection surface at a second image-capturing resolution that is a lower image-capturing resolution than the first image-capturing resolution; and
detect manipulation on the image of the projection surface at the second image-capturing resolution.

2. The projector according to claim 1, wherein the controller is further configured to:
detect a manipulation of an indicator with respect to the projection surface based on the image of the projection surface at the second image-capturing resolution, and
in a case where the detected manipulation corresponds to a condition that is set in advance, perform a process that is correlated with the set condition.

3. The projector according to claim 1, wherein the controller is further configured to detect a manipulation of an indicator with respect to a manipulation region that is set to the projection surface.

4. The projector according to claim 3, wherein the controller is further configured to detect the manipulation of the indicator based on a variation in at least one of a brightness and a shape of the manipulation region.

5. The projector according to claim 3, wherein the controller is further configured to extract an image of the indicator, which performs indication with respect to the projection surface, from the image of the projection surface at the second image-capturing resolution.

6. The projector according to claim 1, wherein the controller is further configured to: when the main body has moved within the predetermined amount of time: if a current operation state of the camera has an image-capturing resolution that is not set to the first image-capturing resolution, set the image-capturing resolution of the current operation state to the first image capturing resolution.

7. The projector according to claim 1, wherein the controller is further configured to: when the main body has not moved within the predetermined amount of time: if a current operation state of the camera has an image-capturing resolution that is not set to the second image-capturing resolution, set the image-capturing resolution of the current operation state to the second image-capturing resolution.

8. The projector according to claim 1, wherein the controller is further configured to: stop display of an image for indication, when movement is detected by the main body during the predetermined amount of time.

9. A method of controlling a projector provided with a main body including an image projector that projects an image, and a movement detector that detects movement of the main body, the method comprising:
determining, based on a detection result of the movement detector, whether the main body has moved within a predetermined amount of time;
when the main body has moved within the predetermined amount of time:
capturing, via a camera, an image of the projection surface at a first image-capturing resolution; and
performing trapezoidal distortion correction based on the image of the projection surface at the first image-capturing resolution; and
when the main body has not moved within the predetermined amount of time:

capturing, via the camera, an image of the projection surface at a second image-capturing resolution that is a lower image-capturing resolution than the first image-capturing resolution; and detecting a manipulation on the image of projection surface at the second image-capturing resolution.

* * * * *